(12) United States Patent
Oren et al.

(10) Patent No.: US 7,400,828 B1
(45) Date of Patent: Jul. 15, 2008

(54) FAULT PROTECTION IN NETWORKS

(75) Inventors: Yair Oren, Tel-Aviv (IL); Yossi Shussman, Kfar Saba (IL)

(73) Assignee: Chromatis Networks Inc., Dover, DE (US)

( * ) Notice: Subject to any disclaimer, the term of this patent is extended or adjusted under 35 U.S.C. 154(b) by 0 days.

(21) Appl. No.: 09/914,523

(22) PCT Filed: Jul. 14, 1999

(86) PCT No.: PCT/US99/15897

§ 371 (c)(1),
(2), (4) Date: Aug. 29, 2001

(87) PCT Pub. No.: WO00/58832

PCT Pub. Date: Oct. 5, 2000

Related U.S. Application Data

(60) Provisional application No. 60/126,118, filed on Mar. 25, 1999.

(51) Int. Cl.
*H04B 10/00* (2006.01)
(52) U.S. Cl. .................................. 398/3; 398/19; 398/20
(58) Field of Classification Search ............... 398/2–7, 398/9–15, 30–34, 76, 82–83
See application file for complete search history.

(56) References Cited

U.S. PATENT DOCUMENTS

| | | | | |
|---|---|---|---|---|
| 5,442,623 A | * | 8/1995 | Wu | 370/224 |
| 5,760,934 A | * | 6/1998 | Sutter et al. | 398/59 |
| 5,982,743 A | * | 11/1999 | Kusano | 370/217 |
| 6,567,194 B1 | * | 5/2003 | Badr | 398/1 |
| 6,657,952 B1 | * | 12/2003 | Shiragaki et al. | 370/223 |
| 6,704,877 B2 | * | 3/2004 | Cline et al. | 713/320 |
| 6,915,075 B1 | * | 7/2005 | Oberg et al. | 398/9 |
| 2002/0080445 A1 | * | 6/2002 | Falkenstein et al. | 359/127 |
| 2002/0114036 A1 | * | 8/2002 | Ghani | 359/128 |

* cited by examiner

*Primary Examiner*—Dzung D Tran

(57) ABSTRACT

A network is maintained functional in the presence of a wide range of faults, including physical fiber cuts, transmission impairments creating signal quality degradation, and failure of equipment modules, for example, transceivers, using a common control and backup channel, either alone or in combination with fiber loopback protection or wavelength loopback protection, or fiber loopback protection or wavelength loopback protection alone. Systems constructed according to the invention require only a single transceiver per wavelength at each node that accesses that wavelength. The invention is equally applicable to type 1 nodes, which drop and add a single, predetermined wavelength, and to type 2 nodes which have the capability to drop and add any subset of the wavelengths employed in the network.

6 Claims, 11 Drawing Sheets

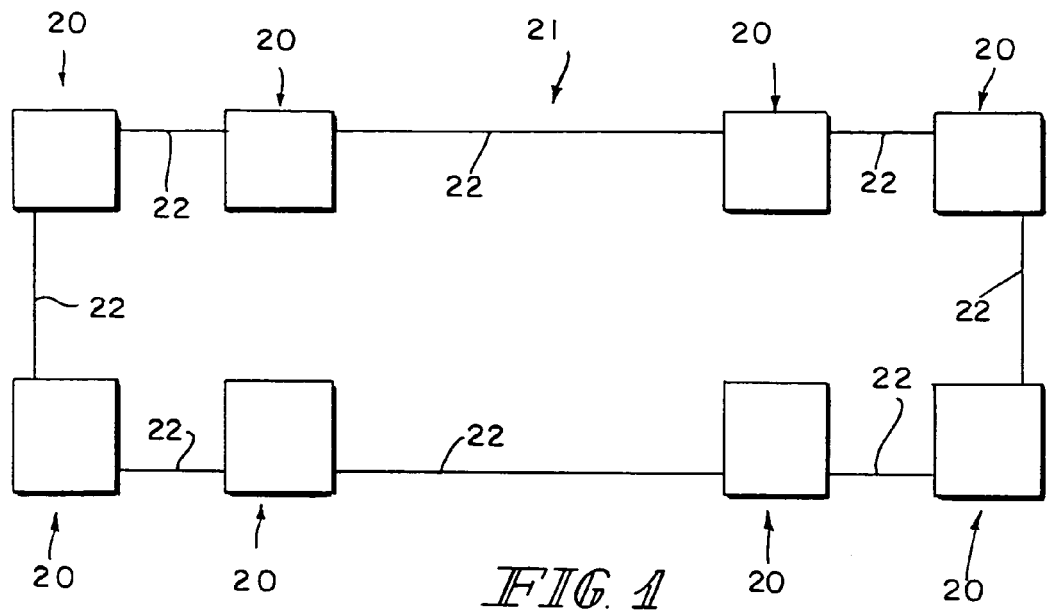
FIG. 1
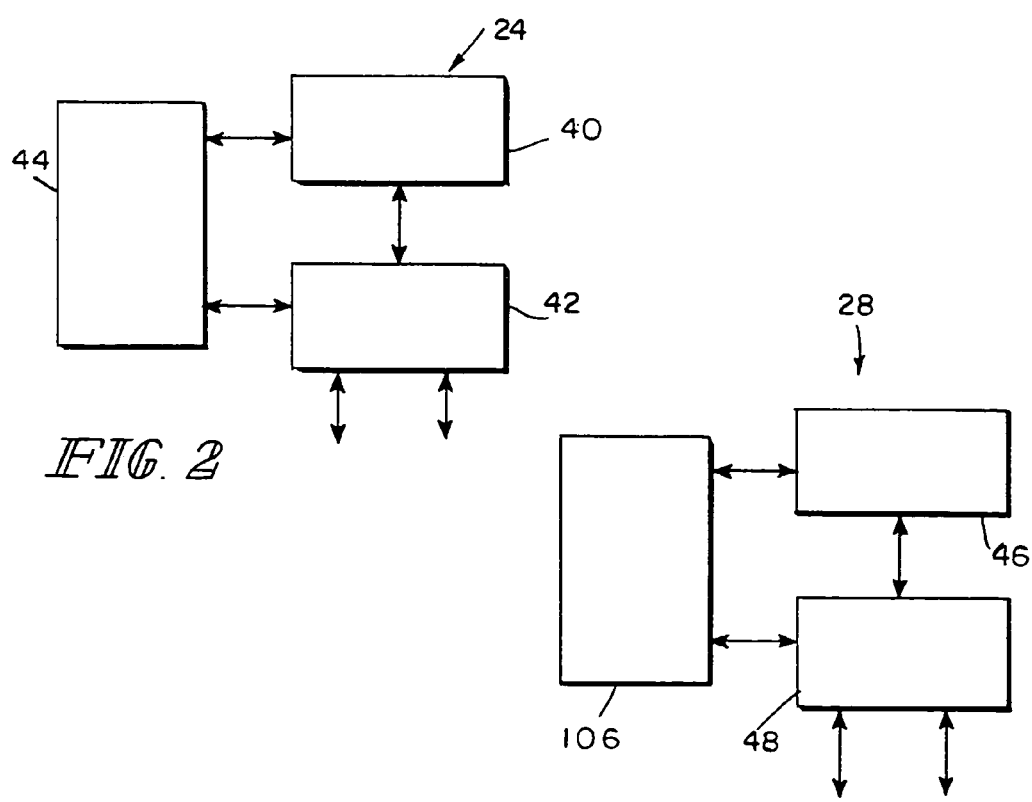
FIG. 2
FIG. 3

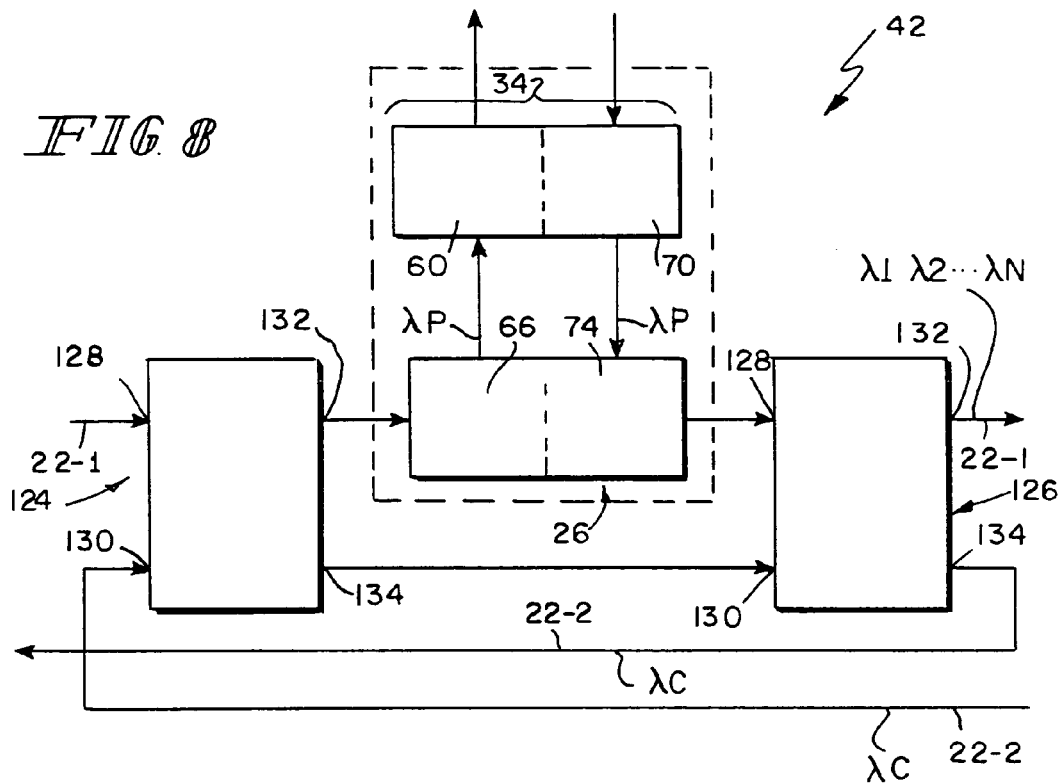
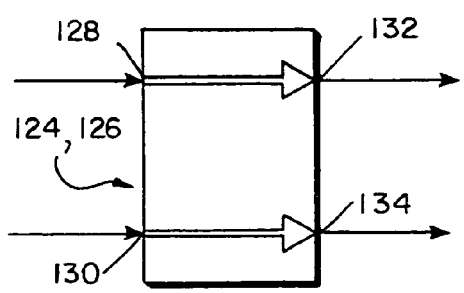
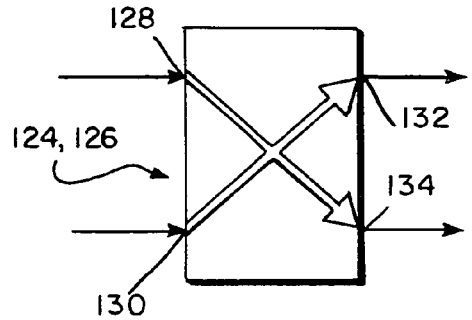

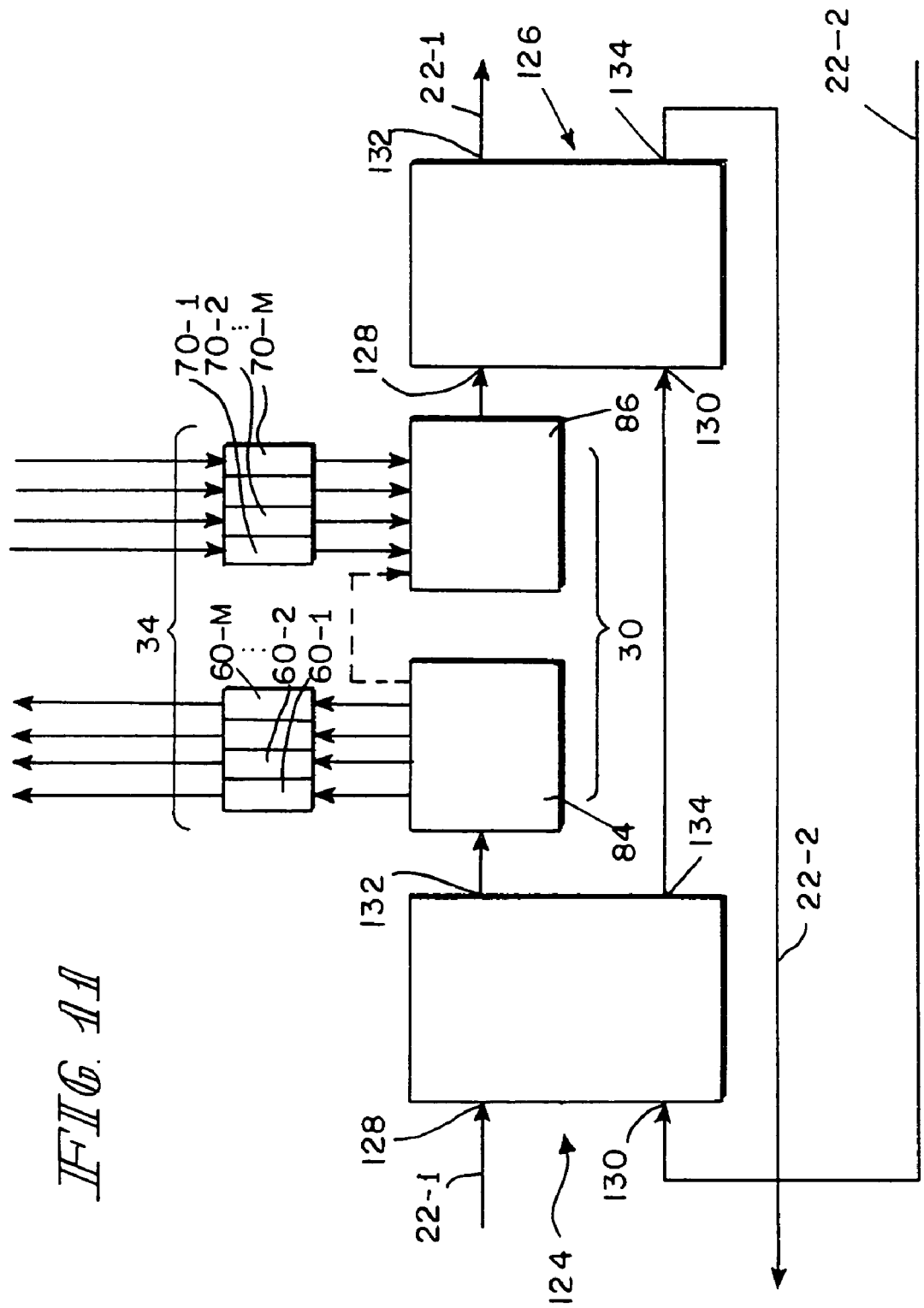

FAULT PROTECTION IN NETWORKS

CROSS-REFERENCES TO RELATED APPLICATIONS

This application is a U.S. national counterpart application of international application Ser. No. PCT/US99/15897 filed Jul. 14, 1999, which claims priority to U.S. provisional application Ser. No. 60/126,118 filed Mar. 25, 1999.

FIELD OF THE INVENTION

The present invention relates to methods and devices for providing fault protection in networks. It is disclosed in the context of fiber optic communication networks, but is believed to be useful in other applications as well.

DISCLOSURE OF THE INVENTION

According to one aspect of the invention, a combination includes a closed loop optical fiber for carrying information modulated on at least two optical carriers, a first one of the carriers having a first wavelength and a second one of the carriers having a second wavelength, and at least two nodes at a first one of which first information modulated on the first carrier and second information modulated on the second carrier is to be recovered and transmitted. The first node comprises a first demultiplexer for demultiplexing the first carrier from the fiber, a second demultiplexer for demultiplexing the second carrier from the fiber, a first multiplexer for multiplexing the first carrier on the fiber, a second multiplexer for multiplexing the second carrier on the fiber, and apparatus for receiving and transmitting first and second information. The apparatus for receiving and transmitting first and second information consists essentially of a first receiver for demodulating first information and a first transmitter for modulating first information on the first carrier before the first carrier is placed on the fiber by the first multiplexer, a second receiver for demodulating second information and a second transmitter for modulating second information on the second carrier before the second carrier is placed on the fiber by the second multiplexer.

Illustratively according to this aspect of the invention, the combination further comprises first and second switches. Each of the first and second switches has first and second input ports and first and second output ports. Each of the first and second switches has first and second states. The first state of each of the first and second switches couples the respective switch's first input port to its first output port and its second input port to its second output port. The second state of each of the first and second switches couples the respective switch's first input port to its second output port and its second input port to its first output port. The first receiver is coupled to the first input port of the first switch. The second receiver is coupled to the second input port of the first switch. The second output port of the first switch is coupled to the second input port of the second switch. The first output port of the second switch is coupled to the first transmitter. The second output port of the second switch is coupled to the second transmitter. The node controls the first and second switches so that when the first carrier is not capable of transmitting first information over the fiber, the first information is modulated on the second carrier for transmission over the fiber.

Additionally according to this aspect of the invention, the combination further comprises a third optical carrier having a third wavelength. The first demultiplexer also removes the third carrier from the fiber. The first multiplexer also places the third carrier on the fiber. The node includes apparatus for receiving and transmitting third information. The apparatus for receiving and transmitting third information consists essentially of a third receiver for demodulating third information from the third carrier and a third transmitter for modulating third information on the third carrier before the third carrier is placed on the fiber by the first multiplexer. The fiber couples the third carrier to the first demultiplexer and the first multiplexer couples the third carrier to the fiber.

Further illustratively according to this aspect of the invention, each of the first and second switches has first, second and third input ports and first, second and third output ports. Each of the first and second switches has first, second, third and fourth states. The first state of each of the first and second switches couples its first input port to its first output port, its second input port to its second output port, and its third input port to its third output port. The second state of each of the first and second switches couples its first input port to its second output port, its second input port to its first output port and its third input port to its third output port. The third state of each of the first and second switches couples its first input port to its first output port, its second input port to its third output port, and its third input port to its second output port. The fourth state of each of the first and second switches couples its first input port to its third output port, its third input port to its first output port, and its second input port to its second output port. The first receiver is coupled to the first input port of the first switch. The second receiver is coupled to the second input port of the first switch. The third receiver is coupled to the third input port of the first switch. The third output port of the first switch is coupled to the third input port of the second switch. The node controls the first and second switches so that when one of the first and third carriers is not capable of transmitting a respective one of first and third information over the fiber, the respective one of first and third information is modulated on the second carrier for transmission over the fiber.

Illustratively according to this aspect of the invention, the combination further comprises a fourth optical carrier having a fourth wavelength. The fiber couples the fourth optical carrier through at least one of the first and second demultiplexers and through at least one of the first and second multiplexers so that the fourth optical carrier passes through the first node unaffected.

Further illustratively according to this aspect of the invention, the fiber couples the fourth optical carrier through the first and second demultiplexers and through the first and second multiplexers.

According to another aspect of the invention, a combination comprises first and second loops of optical fiber for carrying information modulated on a first optical carrier having a first wavelength, and at least two nodes at a first one of which first information modulated on the first carrier is to be received and transmitted. The first node comprises a first demultiplexer for demultiplexing the first carrier from the first fiber, a first multiplexer for multiplexing the first carrier on the first fiber, and apparatus coupled to the first demultiplexer for receiving, and to the first multiplexer for transmitting, first information. The combination further comprises first and second switches, each having first and second input ports and first and second output ports. Each of the first and second switches has first and second states. The first state of each of the first and second switches couples the respective switch's first input port to its first output port and its second input port to its second output port. The second state of each of the first and second switches couples the respective switch's first input port to its second output port and its second input port to its first output port. The first optical fiber is coupled to the first input port of the first switch and to the first output port of the second switch. The second optical fiber is coupled to the second input port of the first switch and to the second output port of the second switch. The first output port of the first switch is coupled to the first demultiplexer. The first multiplexer is coupled to the first input port of the second switch. The second output port of the first switch is coupled to the second input port of the second switch.

Illustratively according to this aspect of the invention, the combination further comprises a second optical carrier. Second information is modulated on the second carrier. The second carrier is transmitted along the first optical fiber in the first direction.

Further illustratively according to this aspect of the invention, the first demultiplexer demultiplexes the second carrier from the first fiber, the first multiplexer multiplexes the second carrier on the first fiber. The combination further comprises apparatus coupled to the first demultiplexer for receiving, and to the first multiplexer for transmitting second information.

Additionally illustratively according to this aspect of the invention, the combination further comprises a third optical carrier transmitted along the second optical fiber in a second direction opposite to the first direction. The third carrier has a third wavelength.

Illustratively according to this aspect of the invention, the first node controls the first and second switches so that when one of the first and second optical carriers is incapable of being transmitted along its respective fiber in its respective direction, one of the first and second switches is switched from its first state to its second state so that the respective optical carrier is transmitted in the opposite direction on the other of the first and second fibers.

According to another aspect of the invention, first and second closed loop optical fibers are provided for carrying information modulated on a first optical carrier having a first wavelength. At least two nodes are provided. At a first one of the nodes first information modulated on the first carrier is to be received and transmitted. The first node comprises a first demultiplexer for demultiplexing the first carrier from the first fiber, a first multiplexer for multiplexing the first carrier on the first fiber, a second demultiplexer for demultiplexing the first carrier from the second fiber, a second multiplexer for multiplexing the first carrier on the second fiber, first apparatus coupled to the first demultiplexer for receiving, and to the first multiplexer for transmitting, first information, and first and second switches. Each of the first and second switches has first and second input ports and first and second output ports. Each of the first and second switches has first and second states. The first state of each of the first and second switches couples the respective switch's first input port to its first output port and its second input port to its second output port. The second state of each of the first and second switches couples the respective switch's first input port to its second output port and its second input port to its first output port. The first optical fiber is coupled to the first demultiplexer. The first demultiplexer is coupled to the first input port of the first switch. The second demultiplexer is coupled to the second input port of the first switch. The first output port of the first switch is coupled to the first receiving apparatus. The first transmitting apparatus is coupled to the first input port of the second switch. The second output port of the first switch is coupled to the second input port of the second switch. The first output port of the second switch is coupled to the first multiplexer. The second output port of the second switch is coupled to the second multiplexer.

Illustratively according to this aspect of the invention, the first node controls the first and second switches so that when the first optical carrier is incapable of being transmitted along the first fiber in the first direction, one of the first and second switches is switched from its first state to its second state so that the first optical carrier is transmitted in the second direction on the second fiber.

Further illustratively according to this aspect of the invention, a second optical carrier is transmitted along the first optical fiber in the first direction. Second information is modulated on the second carrier.

Additionally illustratively according to this aspect of the invention, the first and second demultiplexers are each capable of demultiplexing the first carrier and the second carrier. Second apparatus is provided for receiving and transmitting the second carrier. The second apparatus is coupled to the first and second demultiplexers for receiving, and to the first and second multiplexers for transmitting, the second information.

Illustratively according to this aspect of the invention, third and fourth switches are provided. Each of the third and fourth switches has first and second input ports and first and second output ports. Each of the third and fourth switches has first and second states. The first state of each of the third and fourth switches couples the respective switch's first input port to its first output port and its second input port to its second output port. The second state of each of the third and fourth switches couples the respective switch's first input port to its second output port and its second input port to its first output port. The first optical fiber is coupled to the first demultiplexer. The first demultiplexer is coupled to the first input port of the third switch. The second demultiplexer is coupled to the second input port of the third switch. The first output port of the third switch coupled to the second receiving apparatus. The second transmitting apparatus is coupled to the first input port of the fourth switch. The second output port of the third switch is coupled to the second input port of the fourth switch. The first output port of the fourth switch is coupled to the first multiplexer. The second output port of the fourth switch coupled to the second multiplexer.

Further illustratively according to this aspect of the invention, the first node controls the third and fourth switches so that when the second optical carrier is incapable of being transmitted along the first fiber in the first direction, one of the third and fourth switches is switched from its first state to its second state so that the second optical carrier is transmitted in the second direction on the second fiber.

Additionally illustratively according to this aspect of the invention, a third optical carrier is transmitted along the second optical fiber in a second direction opposite to the first direction. The third carrier has a third wavelength.

BRIEF DESCRIPTION OF THE DRAWINGS

The invention may best be understood by referring to the following detailed descriptions of illustrative embodiments, and the accompanying drawings which illustrate the invention. In the drawings:

FIG. 1 illustrates a highly simplified block diagram of a network capable of incorporating the present invention;

FIG. 2 illustrates a functional block diagram of a possible detail of the network illustrated in FIG. 1;

FIG. 3 illustrates a functional block diagram of a possible detail of the network illustrated in FIG. 1;

FIG. 8 illustrates a functional block diagram of a possible detail of the network illustrated in FIG. 1;

FIGS. 9-10 illustrate two states of a detail of the systems illustrated in FIGS. 4-8 and 11-17;

FIG. 11 illustrates a functional block diagram of a possible detail of the network illustrated in FIGS. 6-7;

DETAILED DESCRIPTIONS OF ILLUSTRATIVE EMBODIMENTS

Figure 4:
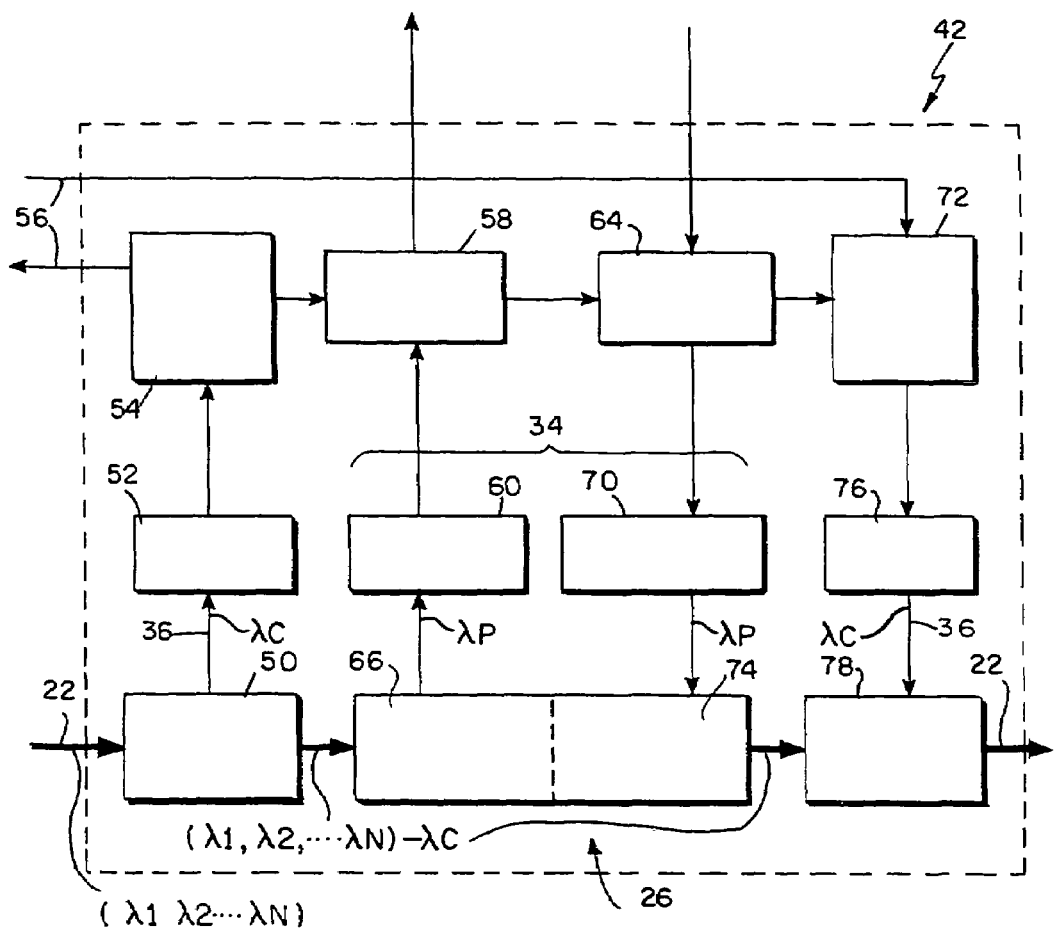
FIG. 4 illustrates a possible architecture of a detail of the system illustrated in FIG. 2.

In order to understand the invention, it is helpful to outline certain characteristics of a typical system which incorporates the invention. Referring to FIG. 1, a set of an arbitrary number of nodes 20 is interconnected in a ring network 21 by a pair of optical fibers 22-1 and 22-2. The data carriers in the optical fiber ring 21 are generated by an arbitrary number, N, of, for example, laser diodes, providing a respective arbitrary number of wavelengths $\lambda 1, \lambda 2, \ldots \lambda N$ in, for example, the 1550 nm and/or 1310 nm bands. These optical carrier sources provide the optical channels interconnecting the network 21 nodes 20, and these channels, or wavelengths $\lambda 1, \lambda 2, \ldots \lambda N$, are carried in a single fiber 22-1, 22-2 using Dense Wavelength Division Multiplexing technology. Each such wavelength $\lambda 1, \lambda 2, \ldots \lambda N$ is hereinafter generally referred to as a DWDM channel.

It is not essential to an implementation of the invention that a particular bit rate or range of bit rates be employed, and so the bit rate of each DWDM channel $\lambda 1, \lambda 2, \ldots \lambda N$ is arbitrary and independent of the rates of other channels $\lambda 1, \lambda 2, \ldots \lambda N$. The protocol used by each DWDM channel $\lambda 1, \lambda 2, \ldots \lambda N$ is arbitrary and independent of the protocol(s) used by other channels $\lambda 1, \lambda 2, \ldots \lambda N$. Examples of various protocols which may be implemented in various ones of the channels $\lambda 1, \lambda 2, \ldots \lambda N$ carried on systems constructed according to the invention include SONET/SDH, ATM and IP. In the illustrated embodiments, all channels $\lambda 1, \lambda 2, \ldots \lambda N$ are assumed to be using SONET/SDH framing. Channels $\lambda 1, \lambda 2, \ldots \lambda N$ which use different protocols, ATM and IP, for example, are simply mapped into the SONET/SDH frames using established standards and techniques.

With reference to FIGS. 2-3, there are two types of nodes 20 in the DWDM network. Type 1 nodes 24 drop and add a single, predetermined wavelength $\lambda P$ by means of an optical demultiplexer/multiplexer pair, or Optical Add/Drop Multiplexer, 26, hereinafter generally referred to as an OADM. Type 1 nodes 24 optionally effect appropriate protocol processing on the signals carried by their assigned wavelengths $\lambda P$. Several type 1 nodes 24 may share the same wavelength $\lambda P$. Type 2 nodes 28 have the capability to generate/terminate any subset $\lambda 1, \lambda 2, \ldots \lambda M$ of the wavelengths $\lambda 1, \lambda 2, \ldots \lambda N$ in the ring using a DWDM multiplexer/demultiplexer 30. A type 2 node 28 can then optionally effect protocol processing on one or more subsets of the terminated wavelengths $\lambda 1, \lambda 2, \ldots \lambda M$. Several nodes 24, 28 of both types can simultaneously access the same wavelength(s) $\lambda 1, \lambda 2, \ldots \lambda N$.

In the embodiment illustrated in FIG. 1, it is understood that virtually any combination of type 1 nodes and type 2 nodes is possible. The invention is intended to maintain the network 21 functional in the presence of a wide range of faults, including physical fiber cuts, transmission impairments creating signal quality degradation, and failure of equipment modules, for example, transceivers 34, using a Common Control and Backup Channel 36 (hereinafter generally referred to as CCBC 36) aspect of the invention. A system constructed according to the invention requires only a single transceiver 34 per wavelength $\lambda P$ at each node 20 that accesses that wavelength $\lambda P$. Prior art networks require multiple transceivers 34 per wavelength $\lambda P$ at each node 20. Thus, the invention substantially reduces the cost of the resulting systems.

A single, specific channel 36 is used as a backup channel for any failed DWDM channel $\lambda 1, \lambda 2, \ldots \lambda N$. When, for example, a transceiver 34 for any of the DWDM channels $\lambda 1, \lambda 2, \ldots \lambda N$ in any of the nodes 24, 28 fails, the backup channel 36 replaces the disabled channel. All nodes 24, 28 which access the wavelength $\lambda P$ of the failed channel replace the failed channel with the backup channel 36. The wavelength $\lambda C$ used by the CCBC 36 is arbitrary. Again, the possibilities include 1310 nm, 1510 nm, and any DWDM wavelength defined by the ITU grid. Network 21 control channel, used for management and fault reporting, is also carried by the same carrier $\lambda C$. Therefore the CCBC 36 is added/dropped at every node 24, 28.

The method used to multiplex the control information and the payload data when the CCBC 36 is activated as a backup for a failed DWDM channel $\lambda 1, \lambda 2, \ldots \lambda N$ depends on the protocol(s) being used in the network 21. One approach, applicable when the data channels in the network use SONET/SDH framing, is to have the control channel 36 use the DCC bytes in the section overhead of the SONET/SDH signal. Another approach, applicable to ATM channels, is to assign a specific ATM VC to the control flow.

A control subchannel 56 of the CCBC 36 is used to coordinate the activation of the backup channel $\lambda C$ to replace a DWDM channel $\lambda 1, \lambda 2, \ldots \lambda N$ for which the transceiver 34 at one of its associated nodes 24, 28 has failed. The node 24, 28 at which failure is detected will notify all other relevant nodes 24, 28, and those nodes 24, 28 will switch from the failed channel to the backup channel $\lambda C$. The exact format of the messages used within the control protocol to achieve this end is not central to this aspect of the invention. However, this kind of message format and message exchange is common in packet oriented control protocols. A significant benefit of this approach is to reduce the number of transceivers 34 utilized at each node 24, 28.

Each node 24, 28 requires a transceiver 34 for each DWDM channel $\lambda 1, \lambda 2, \ldots \lambda N$ with which it is associated, plus a transceiver 34 for the CCBC 36. Thus, an alternative approach to providing resiliency against the failure of a transceiver 34 would be to provide two transceivers 34 per associated wavelength $\lambda 1, \lambda 2, \ldots \lambda N$ in each node. This is especially significant in type 2 nodes, where the number of wavelengths $\lambda 1, \lambda 2, \ldots \lambda M$ terminated at a node 28 can be large. Combining the backup function with the control function on the same channel λC further reduces the number of transceivers 34 required by eliminating the additional transceiver 34 for the control channel. Using relatively inexpensive optical technology, such as 1310 nm components, for the CCBC 36 provides an extremely cost-effective solution to this problem.

FIG. 2 illustrates a functional block diagram of a type 1 node 24 according to the present invention. A processing subsystem 40 applies the protocol processing appropriate to a particular network 21 application. Examples of processing subsystems 40 include SONET/SDH multiplexers and ATM multiplexers. It is also possible to have a "null" processing subsystem 40, for example, an opto-electrical transponder, which transmits the signal unaffected to the next node 24, 28. The processing subsystem 40 provides an electrical signal to an optical subsystem 42 for transmission on an assigned DWDM channel λ1, λ2, ... λN, or on the backup channel λC when the need arises. The optical subsystem 42 also has tributary ports which permit the connection of equipment using the transport services of the network 21 under consideration. The optical subsystem 42 implements the optical add/drop function. This function permits the transmission of the electrical signal produced by the processing subsystem 40 on the DWDM channel λP associated with this node 24. It also enables the node 24 to participate in network 21-wide protection and backup activation events. A control subsystem 44 manages, configures and monitors the operation of the other subsystems 40, 42, and handles all communications on the CCBC 36.

FIG. 3 illustrates a functional block diagram of a type 2 node 28 according to the present invention. A processing subsystem 46 provides protocol-related processing functions, such as the cross-connect/switching function, and all protocol processing for all wavelengths λ1, λ2, ... λM terminated at this node 28. In the case of a SONET/SDH application, the processing subsystem 46 can provide the functionality of a SONET/SDH cross-connect, as well as all SONET/SDH related protocol processing. In the case of an ATM application, the processing subsystem 46 can provide the functionality of an ATM VPX and the associated protocol processing. A "null" processing subsystem 46, that is, a set of electro-optical transponders for the optical channels λ1, λ2, ... λM served by this node 28, may also be provided. The processing subsystem 46 provides to an optical subsystem 48 an electrical channel for each DWDM channel λ1, λ2, ... λM terminated by this node 28. The optical subsystem 48 also has tributary ports which permit the connection of equipment using the transport services of the network 21.

FIG. 4 illustrates a possible architecture of an optical subsystem 42 for a type 1 node 24. The incoming fiber 22-1 or 22-2 carries a DWDM signal composed of various wavelengths λ1, λ2, ... λN, one of which is the CCBC 36 wavelength λC and another of which is the specific wavelength λP associated with this type 1 terminal 24. Several other wavelengths λ1, λ2, ... λN)-λC-λP may be present in the signal. All of such additional wavelengths (λ1, λ2, ... λN)-λC-λP will pass through the illustrated type 1 node 24 unaffected. The combined DWDM signal λ1, λ2, ... λN first goes through an optical drop component 50 for the wavelength λC used by the CCBC 36. This component 50 removes, or drops, the wavelength λC of the CCBC 36 from the composite DWDM signal λ1, λ2, ... λN and provides the thus separated CCBC wavelength λC to a CCBC receiver 52. The remaining wavelengths (λ1, λ2, ... λN)-λC pass through the optical drop component 50 unchanged. The exact nature of the CCBC optical drop component 50 depends on the wavelength λC used for that channel 36.

The CCBC receiver 52 converts the isolated CCBC optical signal λC into an electrical signal. The resulting electrical signal goes into a control subchannel demultiplex function 54 which separates the control component 56 in the CCBC 36 from any data component which will exist, for example, if the CCBC 36 is also currently functioning as a backup channel. The exact nature of the demultiplex function 54 depends on the structure of the signal, that is, whether the signal is, for example, a SONET/SDH signal, or an ATM signal, or an IP signal. In case of a SONET/SDH signal (or a SONET/SDH framed signal), the information contained in the DCC bytes of the section overhead in the SONET/SDH frames must be isolated. This can be accomplished by commercially available SONET/SDH framing components such as, for example, the SPECTRA or SUNI devices from PMC-Sierra. If the control subchannel 56 is carried as a specific VC in an ATM cell flow or as a specifically addressed packet flow in an IP packet stream, suitable hardware can be devised to effect the required separation functionality. This functionality is found in ATM switching systems and IP routing systems, respectively.

The resulting isolated control flow is provided via a control channel 56 to control subsystem 44 (FIG. 2). The remaining isolated data stream (again, if the CCBC 36 is also currently functioning as a backup channel) is provided to a receive, or Rx, selector function 58. The Rx selector function 58 is able to select, given suitable control signals, a normal state or a backup state. When the Rx selector 58 is in the normal state, the signal originating in a DWDM receiver 60 is passed on as the data channel to the processing subsystem 40 and the data component produced by the control subchannel demultiplexer function 54 is passed through to a transmit, or Tx, selector function 64, which will be described subsequently. When the Rx selector 58 is in the backup state, the signal originating in the DWDM receiver 60 is discarded, and the data component produced by the control subchannel demultiplexer function 54 is passed through to the processing subsystem 40. The Rx selector function 58 can be implemented with, for example, a 2×2 analog switch of the type illustrated in FIGS. 9-10.

After having gone through the C/B channel drop function 50, the incoming signal λ1, λ2, ... N, less the CCBC wavelength λC, which has now been removed, next goes into the optical drop function 66 for the DWDM channel with which the specific type 1 node 24 being considered is associated. The optical drop function 66 removes the DWDM channel λP associated with this node 24 from the combined incoming signal and provides it to the DWDM receiver 60. The remaining wavelengths (λ1, λ2, ... λN)-λC-λP pass through the optical drop function 66 unaffected. The exact nature of the DWDM optical drop component 66 depends on the wavelength λP associated with the specific type 1 node 24 being considered.

The DWDM receiver 60 transforms the isolated DWDM channel λP into an electrical signal. The resulting electrical signal goes to the Rx selector function 58, previously described.

The Tx selector function 64 is able to select, given suitable control signals, one of two configurations, the normal state or the backup state. In the normal state, the data signal from the processing subsystem 40 is passed to a DWDM transmitter 70, to be transmitted as this node 24's DWDM channel λP, and the data stream provided by the Rx selector function 58 is passed through as the data component into the control subchannel multiplexer function 72. When the Tx selector function 64 is in the backup state, the data signal from the processing subsystem 40 is passed as the data component into the control subchannel multiplexer function 72, and no signal is provided to the DWDM transmitter 70. The Tx selector function 64 can be implemented with, for example, a 2×2 analog switch of the type illustrated in FIGS. 9-10. Again, such switches are available from, for example, Vitesse. The DWDM transmitter 70 is one suitable for the wavelength λP used for this channel.

The resulting optical signal is then incorporated into the combined DWDM signal (λ1, λ2, . . . λN)-λC by an optical add component 74 suitable for this wavelength λP. The output signal of the optical add component 74 will contain the wavelength λP associated with the specific type 1 node 24 being considered, as well as any other wavelengths (λ1, λ2, . . . λN)-λC present in the incoming signal. If no signal is provided to the DWDM transmitter 70, the latter is disabled and will not generate any optical signal to be added into the outgoing composite DWDM signal.

The control subchannel multiplex function 72 multiplexes the data stream provided by the Tx selector 64 with the control channel λC originating in the control subsystem 44. The exact nature of this multiplexing function 72 depends on the type and format of the signal, as explained above for the demultiplex function 54. It can be implemented with, for example, the same types of components and logical hardware identified above. The resulting signal is converted by the C/B transmitter 76 into an optical signal. The type of transmitter 76 required depends on the wavelength λC used for the CCBC 36.

The optical signal generated by the C/B transmitter 76 is incorporated into the combined DWDM signal λ1, λ2, . . . λN by the optical add function 78 for the CCBC 36. The resulting Fiber OUT signal contains all wavelengths (λ1, λ2, . . . λN)-λC-λP which pass through the node 24 unaffected, as well as the particular DWDM channel wavelength λP associated with the specific type 1 node being considered (if that wavelength is active) and the wavelength λC used for the CCBC 36 carrying the locally (re-)generated signal. In summary, the functional behavior of the optical subsystem 42 for the type 1 node 24 is as follows. The CCBC 36 is dropped 50. The control subchannel 56 is isolated 54 and passed 56 to the control subsystem 44. The incoming DWDM channel λP associated with the specific type 1 node 24 being considered is dropped 66 and passed 60, 58 to the processing subsystem 40. If the backup channel has been activated to replace the DWDM channel λP associated with the node 24, the data component of the CCBC 36, instead of the DWDM channel λP, is passed 54, 58 to the processing subsystem 40.

In the normal state the data signal provided by the processing subsystem 40 is transmitted 64 on the DWDM channel λP, which is incorporated 70, 74 into the combined DWDM signal λ1, λ2, . . . λN traversing the node 24. Also, the data component of the CCBC 36 passes through 54, 58, 64 the node 24 and is multiplexed 72 with the control signal generated 56 by the control subsystem 44. The combined signal is transmitted 76, 78 on the CCBC 36. This permits use of the CCBC 36 to replace wavelengths (λ1, λ2, . . . λN)-λP other than the one, λP, associated with the specific type 1 node 24 being considered.

In the backup state, the data signal provided by the processing subsystem 40 is multiplexed 64, 72 with the control signal generated by the control subsystem 44, and the combined signal is then transmitted on the CCBC 36. It is assumed that all nodes 24, 28 associated with the failed wavelength λP will be in the backup state with respect to this wavelength λP, and that this wavelength λP will thus be handled by all such nodes 24, 28 over the CCBC 36.

Once a node 24 is notified via the control channel that the DWDM channel λP with which it is associated should be transferred to the CCBC 36, that node 24 puts both its Rx selector 58 and its Tx selector 64 in the backup state.

Figure 5:
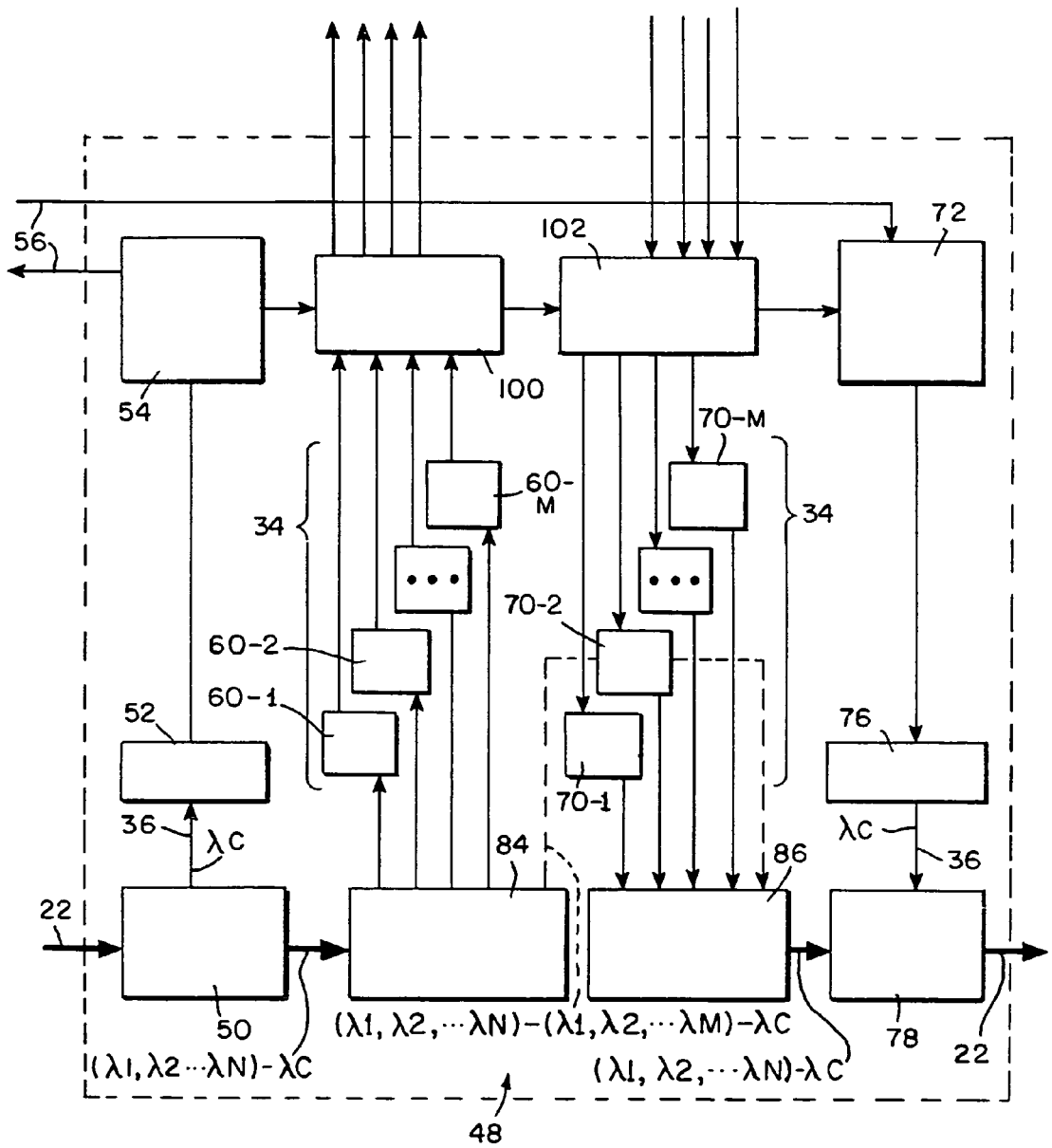
FIG. 5 illustrates a possible architecture of a detail of the system illustrated in FIG. 3.

FIG. 5 illustrates a possible architecture for an optical subsystem 48 for a type 2 node 28. The incoming fiber 22 carries a DWDM signal composed of three distinct types of wavelengths. One wavelength λC is the one associated with the network 21's CCBC 36. A second type of wavelengths includes those wavelengths λ1, λ2, . . . λM terminated at the specific type 2 node 28 being considered. These go through a transceiver 34 comprising receivers 60-1, 60-2, . . . 60-M and transmitters 70-1, 70-2, . . . 70-M for the respective wavelengths λ1, λ2, . . . λM and are processed by the processing subsystem 46 of the specific type 2 node 28 being considered. A third type of wavelengths includes those through wavelengths (λ1, λ2, . . . λN)-(λ1, λ2, . . . λM)-λC which pass through the specific type 2 node 28 being considered unaffected. These through wavelengths (λ1, λ2, . . . λN)-(λ1, λ2, . . . λM)-λC are bridged at the optical level from a DWDM demultiplexer 84 to DWDM multiplexer 86. The CCBC 36 is available to replace any channel λ1, λ2, . . . λM that is terminated locally. Note that no transceiver 34 failure can affect a through wavelength (λ1, λ2, . . . λN)-(λ1, λ2, . . . λM)-λC, and hence there is no need for the CCBC 36 to protect any through wavelength (λ1, λ2, . . . λN)-(λ1, λ2, . . . λM)-λC at the specific type 2 node 28 being considered.

The combined signal λ1, λ2, . . . λN first goes through an optical drop component 50 for the wavelength λC used by the CCBC 36. This optical drop 50 component illustratively can be identical to the one described above for the type 1 node 24. The C/B receiver function 52 and the control subchannel demultiplexer function 54 are identical to those described above for the type 1 node 24. After having gone through the optical drop function 50 for the C/B channel, the incoming signal λ1, λ2, . . . λN less the CCBC wavelength λC next goes into the DWDM demultiplexer 84. The DWDM demultiplexer 84 demultiplexes the composite DWDM signal less the CCBC wavelength ((λ1, λ2, . . . λN)-λC) into its constituent wavelengths. Each wavelength is then either connected to a suitable receiver 60-1, 60-2, . . . 60-M for wavelengths λ1, λ2, . . . λM, or fiber optically bridged to the DWDM multiplexer function 86 described below for through wavelength (λ1, λ2, . . . λN)-(λ1, λ2, . . . λM)-λC. Receivers 60-1, 60-2, . . . 60-M transform the isolated DWDM channels λ1, λ2, . . . λM into electrical signals. The resulting electrical signals go into an Rx selector function 100.

The Rx selector function 100 has M+1 input ports and M+1 output ports, where M is the number of wavelengths terminated at the specific type 2 node 28 being considered. M inputs are connected to the electrical outputs of the λ1, λ2, . . . λM receivers 60-1, 60-2, . . . 60-M. The M+1st input is for the data component of the control subchannel demultiplexer function 54. M output ports of the Rx selector 58 are connected to the processing subsystem 46. The M+1st output is connected to a Tx selector 102 described below. Given suitable control signals, the Rx selector 100 can configure either the normal state or the backup state. In the normal state, the M inputs from the λ1, λ2, . . . λM receivers 60-1, 60-2, . . . 60-M are routed to the M outputs connected to the processing subsystem 46. The data component produced by the control subchannel demultiplexer function 54 is passed through the Rx selector function 100 to the Tx selector function 102. In the backup state, one, λP, of the signals originating in one of the λ1, λ2, . . . λM receivers 60-1, 60-2, . . . 60-M is discarded. The data component produced by the control subchannel demultiplexer function 54 is passed through to the processing subsystem 46 in the place of λP. The other signals (λ1, λ2, . . . λM)-λP from the receivers (60-1, 60-2, . . . 60-M)-60-P are connected to the respective outputs of the Rx selector 100, as before. This replacement of a DWDM channel λP by the CCBC 36 can be applied to any one of the DWDM channels 60-1, 60-2, . . . 60-M. Such a selector function 100 can be implemented with, for example, an (M+1)×(M+1) analog switch.

The Tx selector function 102 is similar to the Rx selector function 100. Given suitable control signals, the Tx selector 102 can configure either the normal state or the backup state. In the normal state, the M inputs from the processing subsystem 46 are routed to the M outputs connected to the λ1, λ2, . . . λM transmitters 70-1, 70-2, . . . 70-M. The data stream from control subchannel demultiplexer 54 provided by the Rx selector function 100 is passed through Tx selector function 102 into the control subchannel multiplexer function 72. In the backup state, one, λP, of the signals λ1, λ2, . . . λM from the processing subsystem 46 is passed as the data component into the control subchannel multiplexer function 72. The other M−1 signals (λ1, λ2, . . . λM)-λP from the processing subsystem 46 are connected to their respective (λ1, λ2, . . . λM)-λP transmitters (70-1, 70-2, . . . 70-M)-70-P. This replacement of a DWDM channel λP by the CCBC 36 can be applied to any one of the DWDM channels λ1, λ2, . . . λM. Again, such a selector function 102 can, for example, be implemented with an (M+1)×(M+1) analog switch.

The λ1, λ2, . . . λM transmitters 70-1, 70-2, . . . 70-M are components suitable for the wavelengths used for their respective DWDM channels λ1, λ2, . . . λM. The resulting λ1, λ2, . . . λM optical signals are then assembled into the composite DWDM signal (λ1, λ2, . . . λN)-λC by the DWDM multiplexer component 86. The output signal of the DWDM multiplexer component 86 under normal conditions contains all the DWDM wavelengths λ1, λ2, . . . λM generated by the local transmitters as well as those (λ1, λ2, . . . λN)-(λ1, λ2, . . . λM) optically bridged from the DWDM demultiplexer 84. In the backup mode, if one, λP, of the λ1, λ2, . . . λM channels is replaced by the CCBC 36, then the corresponding transmitter 70-P will not generate any signal.

The control subchannel multiplexer function 72 multiplexes the data stream provided by the Tx selector 102 with the control channel 56 originating in a control subsystem 106 (FIG. 3). The control subchannel multiplexer component 72 can, for example, be the same as the one described above in connection with the description of the type 1 node 24.

The optical signal λC generated by the C/B transmitter 76 is incorporated into the combined DWDM signal λ1, λ2, . . . λN by the optical add function 78 for the CCBC 36. The resulting Fiber OUT signal contains all pass-through wavelengths (λ1, λ2, . . . λN)-(λ1, λ2, . . . λM)-λC, as well as the local DWDM channel wavelengths (λ1, λ2, . . . λM) and the wavelength λC used for the CCBC, carrying the locally (re-) generated signal away from the specific type 2 node 28 being considered.

Figure 6:
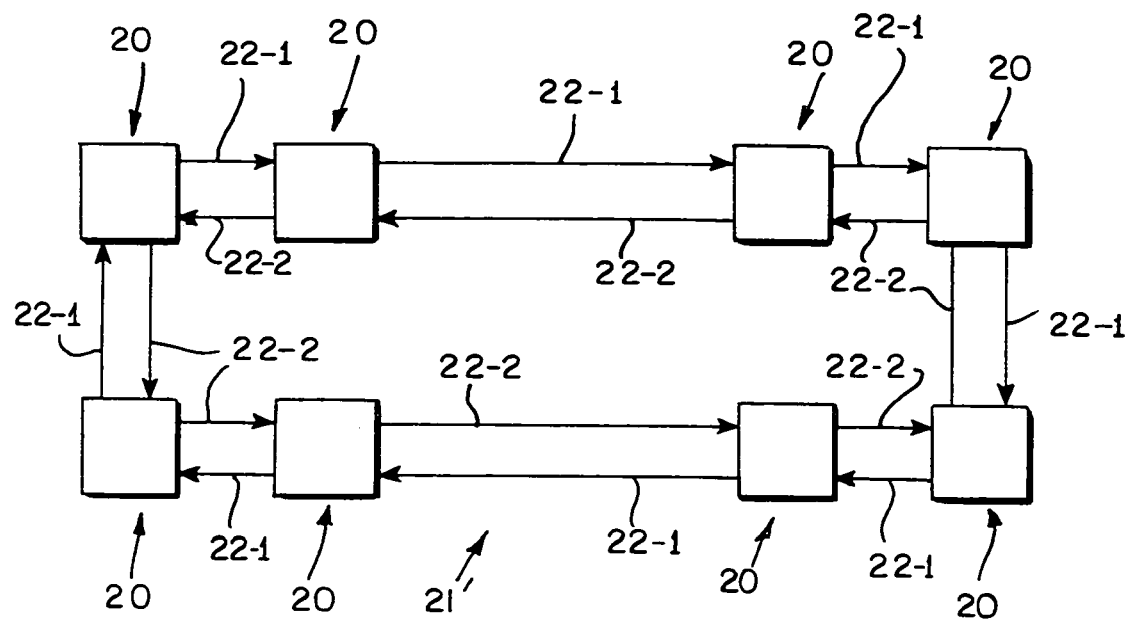
FIG. 6 illustrates a highly simplified block diagram of a network incorporating the present invention.

According to another aspect of the invention, two different additional protection mechanisms are explored. These are generally referred to hereinafter as Fiber Loopback Protection (hereinafter generally referred to as FLP), and Wavelength Loopback Protection (hereinafter generally referred to as WLP). With reference to FIG. 6, a network 21' constructed according to the invention operates over a pair of parallel fiber rings 22-1, 22-2 that carry traffic in opposite directions (hereinafter sometimes referred to for convenience as West and East). Under normal conditions only one, 22-1, of the fibers is normally used for traffic. The second fiber 22-2 is normally used only to overcome faults. For purposes of the following description, the fiber 22-1 which is designated normally to carry the traffic is called the primary fiber. The traffic direction on the primary fiber 22-1 will sometimes be referred to hereinafter as clockwise, or West to East. The second fiber 22-2 is called the protection fiber. The traffic direction on the protection fiber 22-2 will sometimes be referred to hereinafter as counterclockwise, or East to West. As previously noted, under normal conditions, all DWDM channels λ1, λ2, . . . λN are transmitted on the primary fiber 22-1.

Both FLP and WLP can be augmented to withstand the failure of a DWDM transceiver 34 using the CCBC reliability strategy. In the implementation of this strategy, a single, specific channel AC is used as a CCBC 36 for any failed DWDM channel λ1, λ2, . . . λN. When a transceiver 34 for any one, λP, of the DWDM channels λ1, λ2, . . . λN in any of the nodes 24, 28 fails, the backup channel AC replaces this channel λP. All other nodes 24, 28 which access this wavelength λP replace it with the backup channel AC. The network control channel, used for management and fault reporting, is also carried by the same signal AC. Therefore the CCBC 36 is dropped and added at every node 24, 28. Several methods can be employed to multiplex the control information carried by λC and the data to be carried by the backup channel when the backup channel is activated. One method, applicable when the data channels in the network use SONET/SDH framing, is to have the control channel use the DCC bytes in the section overhead of the SONET/SDH signal.

The optical subsystems 42, 48 have the capability to terminate and generate all the DWDM channels accessed by a node 24, 28 and to pass the remaining channels. The optical subsystem 42, 48 incorporates multiplexing and demultiplexing functionality for the DWDM channels, as well as suitable receivers 60 and transmitters 70. The optical subsystem 42, 48 also provides an optical interface to the control channel and permits the type 2 node to participate in network-wide protection and backup activation events. The control subsystem 44, 106 manages, configures and monitors the operation of the other subsystems, and handles all communications on the CCBC 36.

Figure 7:
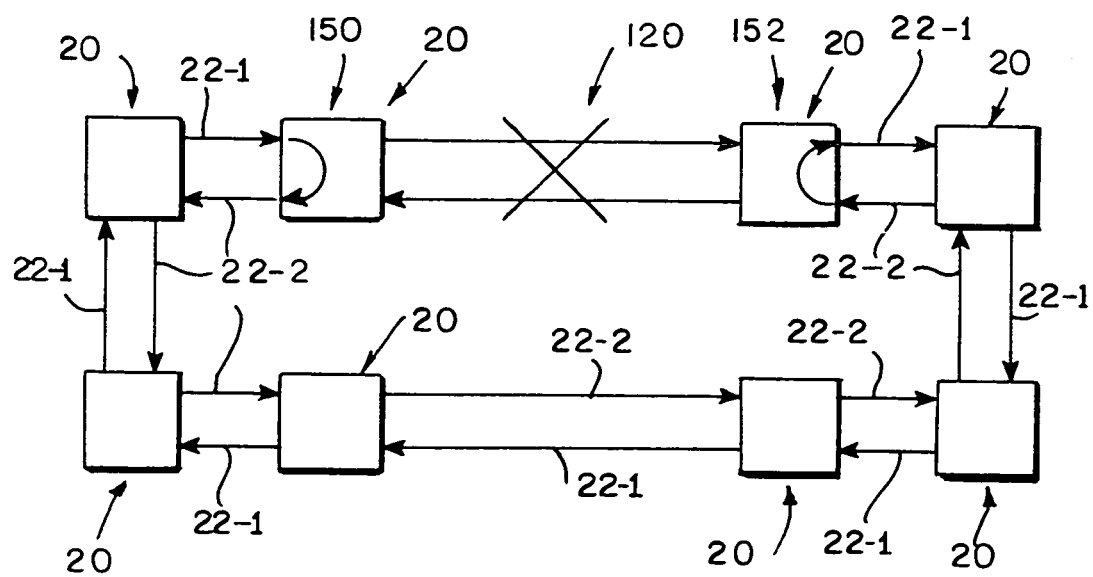
FIG. 7 illustrates a highly simplified block diagram of the network illustrated in FIG. 6 in a fault condition.

Under FLP, a fault 120, for example, a fiber cut, or a transmission impairment which degrades the quality of any signal traversing the faulty segment, which renders a segment of the network 21' unusable, is handled by looping back all signals carried by the primary fiber 22-1 using the protection fiber 22-2. As illustrated in FIGS. 6 and 7, looping back all signals carried by the primary fiber 22-1 using the protection fiber 22-2 "closes" the disrupted network 21'. Each node 20 can be either a type 1 node 24 or a type 2 node 28. When any kind of fault 120 (FIG. 7), for example, a fiber cut, occurs on the network 21', the affected nodes 20 loop away from the fault 120, using the protection fiber 22-2.

FLP can be implemented in type 1 nodes 24 using, for example, the architecture illustrated in FIGS. 8-10. Optical switches 124, 126 permit route switching for optical signals λ1, λ2 . . . λN. A 2×2 optical switch 124, 126 has two optical inputs 128, 130 and two optical outputs 132, 134. The optical switches 124, 126 have two possible settings, one illustrated in FIG. 9 and the other illustrated in FIG. 10. The optical switches 124, 126 can be programmed electronically to alter their current setting. An OADM 26 removes the wavelength λP associated with the specific type 1 node 24 under consideration from the combined incoming signal λ1, λ2, . . . λN and provides the isolated wavelength λP to a receiver (Rx) function 60 within a transceiver 34. The remaining wavelengths (λ1, λ2, . . . λN)-λP pass through the drop component 66 of OADM 26 unchanged, and are added back to the primary fiber 22-1 by the add component 74 of OADM 26. The optical signal λP generated by the transmitter (Tx) function 70 of the specific type 1 node 24 under consideration, assumed to be of the same wavelength λP as the wavelength λP isolated by the type 1 node 24's Rx function 60, is combined by the add component 74 of the OADM 26 with all the remaining wavelengths (λ1, λ2, . . . λN)-AP. The exact nature of the OADM component 26 depends on the wavelength λP used for that channel. The transceiver function 34 (comprising a DWDM receiver 60 and transmitter 70) provides the optical-to-electrical and electrical-to-optical conversions which interface the processing subsystem 40 to the optical subsystem 42.

The optical switches 124, 126 permit the network 21' to effect normal routing in which the signal coming in on the primary fiber 22-1 from the West goes through the OADM 26 and out Eastbound. Any signal AC on the protection fiber 22-2 passes through the optical switches 124, 126 in an East-to-West direction unaffected. Normal routing is used by the node 24 being considered under normal conditions (no faults 120) as well as by all other nodes 24, 28 that are not adjacent to any existing faults 120.

The optical switches 124, 126 also permit the system to effect West loopback routing 150 (FIG. 7). In West loopback routing 150, the signals coming in on the primary fiber 22-1 from the West go through the OADM 26 and are looped back by the Eastern switch 126 into the protection fiber 22-2. Once routed to the protection fiber 22-2, the signals coming in on the primary fiber 22-1 from the West travel back West. The Eastern interface 130, 132 is practically disabled eastward from the node 24 at which switching has occurred. West loopback routing 150 is used to overcome a fault 120, such as a fiber cut or failed node, East adjacent the node 24 at which switching has occurred.

The optical switches 124, 126 also permit the system to effect East loopback routing 152 (FIG. 7). In East loopback routing 152, the signals coming in on the protection fiber 22-2 from the East go through the OADM 26 and are looped back by the Eastern switch 126 into the primary fiber 22-1. Once routed to the primary fiber 22-1, the signals coming in on the protection fiber 22-2 from the East travel back East on primary fiber 22-1. The Western interface 128, 134 is practically disabled westward from the node 24 at which switching has occurred. East loopback routing 152 is used to overcome a fault 120, such as a fiber cut or failed node, West adjacent the node 24 at which switching has occurred.

FLP can be implemented in type 2 nodes 28 using, for example, the architecture illustrated in FIG. 11. The functions of the optical switches 124, 126 are identical. The optical signal entering the DWDM demultiplexer 84 is assumed to carry all the wavelengths λ1, λ2, . . . λN currently active in the network 21'. The optical demultiplexer 84 demultiplexes the combined wavelength signal into its constituent wavelengths λ1, λ2, . . . λN. Each of the wavelengths λ1, λ2, . . . λM that is terminated at the specific type 2 node 28 under consideration then goes through a respective receiver 60-1, 60-2, . . . 60-M. The receivers 60-1, 60-2, . . . 60-M transform the optical signals λ1, λ2, . . . λM into electrical signals, which are then provided to the processing subsystem 46. Likewise the multiple electrical signals provided by the processing subsystem 46 are supplied to their respective DWDM transmitters 70-1, 70-2, . . . 70-M, which convert the multiple electrical signals into optical signals, each at its own required wavelength λ1, λ2, . . . λM. These different wavelengths λ1, λ2, . . . λM are then combined into a single fiber by the optical multiplex component 86. Some wavelengths (λ1, λ2, . . . λN)-(λ1, λ2, . . . λM) may not be terminated at the specific type 2 node 28 under consideration. These unterminated wavelengths (λ1, λ2, . . . λN)-(λ1, λ2, . . . λM) will be optically bridged from the optical demultiplexer 84 to the optical multiplexer 86 and will not go through the transceiver 34.

A network 21' using FLP as described above can withstand faults 120 such as fiber cuts or other types of faults that render a segment of the fiber 22-1, 22-2 unusable. Augmenting FLP with a CCBC architecture, as described above in connection with FIGS. 4-5, can enhance the resilience of the network 21' by enabling it to withstand the failure of different optical modules, such as transceivers 34 or OADM components 66, 74, 84, 86. This enhanced resilience is achieved by having the CCBC 36 replace any of the DWDM channels in use should they fail, again as described above in connection with FIGS. 4-5.

Incorporating CCBC into a type 1 node 24 can be achieved by replacing its optical subsystem 42 with the one described above in connection with FIG. 4 for a type 1 node 24. In a similar manner, incorporating CCBC into a type 2 node can be achieved by replacing its optical subsystem 42 with the one described above in connection with FIG. 5.

Figure 12:
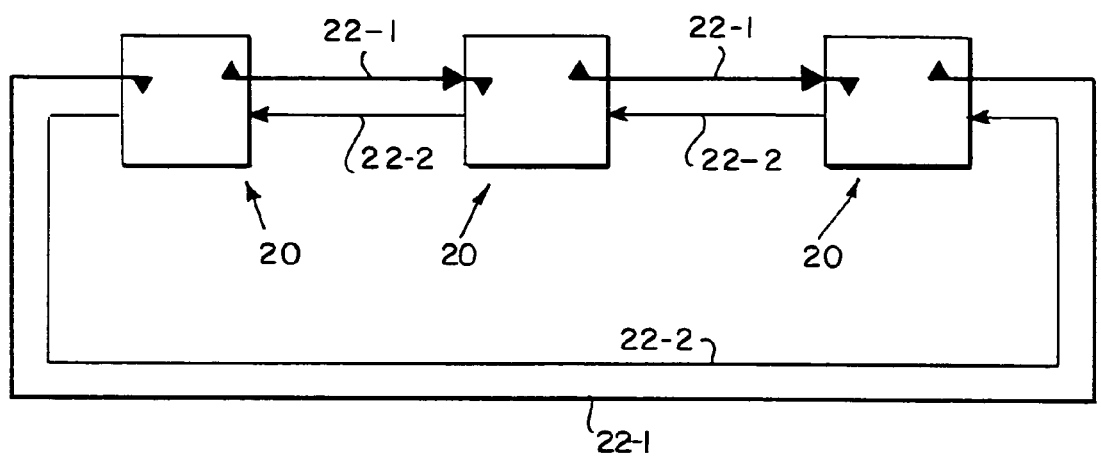
FIG. 12 illustrates a highly simplified block diagram of a network incorporating the present invention.
Figure 13:
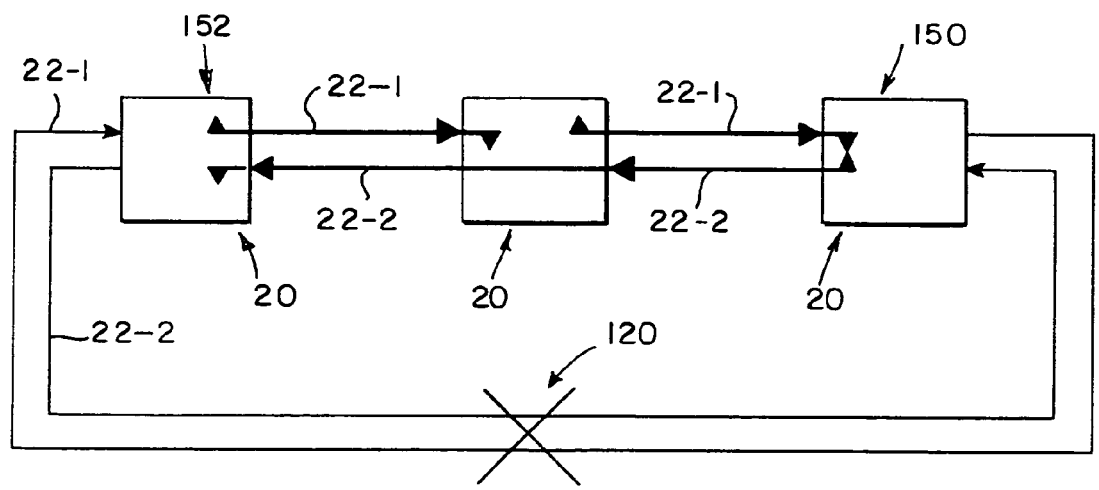
FIG. 13 illustrates a highly simplified block diagram of the network illustrated in FIG. 12 in a fault condition.

Unlike FLP, in which the whole fiber 22-1, 22-2 is looped away from a fault 120, under WLP each wavelength λ1, λ2, . . . λN can be looped back at each node that accesses it, independently of the other wavelengths λ1, λ2, . . . λN. In other words, a type 1 node 24 can loop back only the wavelength λ1, λ2, . . . λN associated with it and a type 2 node 28 can loop back any of the wavelengths λ1, λ2, . . . λN which it terminates, and can loop back any of the wavelengths λ1, λ2, . . . λN which it terminates independently of its handling of any other wavelength λ1, λ2, . λN. When describing the behavior of the network 2' with respect to a specific wavelength λP, it is possible to describe the normal behavior of the network 21' with respect to λP, ignoring all nodes 24, 28 that do not access λP. FIG. 12 illustrates the transmission of λP under normal conditions. The symbol ▲ indicates an optical add operation 74, 86 and a transmitter 70, 70-1, 70-2, . . . 70-N. The symbol ▼ indicates an optical drop operation 66, 84 and a receiver 60, 60-1, 60-2, . . . 60-N. FIG. 13 illustrates how the network 21' illustrated in FIG. 12 responds when a fault 120, indicated by the symbol X, renders one of the interconnecting segments of primary fiber 22-1 unusable for a wavelength λP. Again, it must be understood that this modified routing applies to a particular wavelength λP, but may not necessarily apply to other wavelengths (λ1, λ2, . . . λN)-AP which may traverse the fault 120 at X unaffected.

It can be seen that the nodes 20 adjacent to the fault 120 have looped their λP transmissions away from the fault 120. Nodes 20 capable of processing λP, but not adjacent the λP fault 120, illustrated in FIG. 13 as a single node 20 on each side of the fault 120 for simplicity, process the signal on its West-to-East traversal (the primary fiber 22-1) and pass λP unaffected. A λP fault 120 on any network 21' segment is handled in this manner. This explanation applies regardless of the number of nodes 20 that access λP. The following rules thus summarize the network 21''s response to a λP fault 120 at any location X. Of the nodes 20 that access λP, the node 20 closest to the fault 120 to the East of the fault 120 activates its East loopback 152 for λP. The node 20 closest to the fault 120 to the West activates its West loopback 150 for λP. All other nodes 20 remain in their normal configurations, processing λP on the primary fiber 22-1 and passing λP on the protection fiber 22-2.

Figure 14:
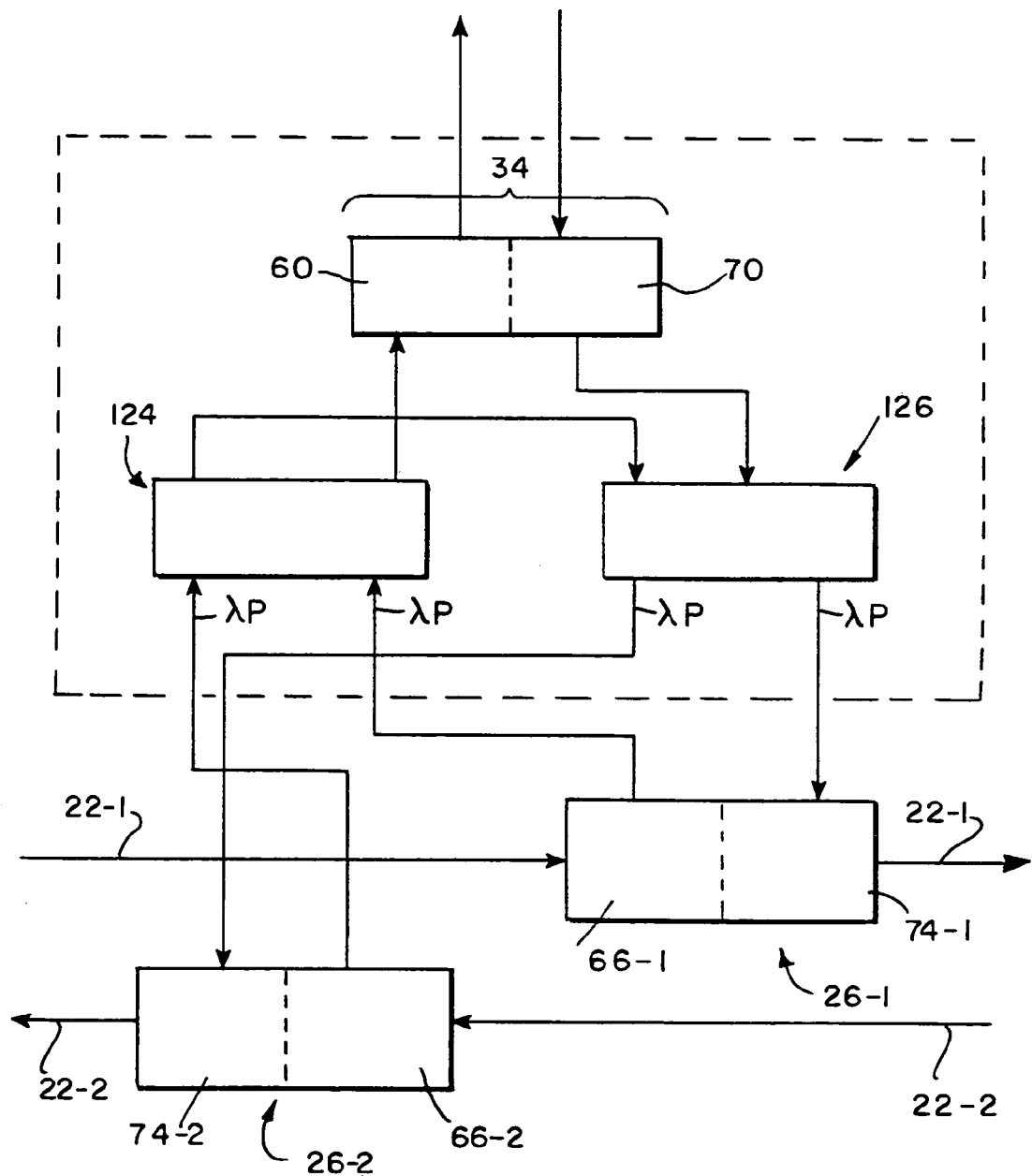
FIG. 14 illustrates a possible architecture of a detail of the system illustrated in FIGS. 12-13.

The functionality required to support WLP in type 1 nodes 24 can be implemented using, for example, the optical subsystem 42 architecture illustrated in FIG. 14. The OADM demultiplexer component 66-1 removes the wavelength λP associated with the specific type 1 node 24 under consideration from the combined incoming signal λ1, λ2, . . . λN and provides the isolated wavelength λP to an Rx optical switch 124. The remaining wavelengths (λ1, λ2, . . . λN)-λP pass through the Rx optical switch 124 unaffected. Likewise the optical signal originating in the Tx optical switch 126, assumed to be of the same wavelength λP, is combined by the OADM 74-1 with all the remaining wavelengths (λ1, λ2, . . . λN)-λP which pass through the Tx optical switch 126 unaffected. The OADM components 66-1, 66-2, 74-1, 74-2 selected depend on the wavelength λP used for that channel. The transceiver function 34 (comprising a DWDM transmitter 70 and receiver 60) provides the optical-to-electrical and electrical-to-optical conversions which interface the processing subsystem 40 to the optical subsystem 42. The 2×2 optical switches 124, 126 illustratively are of the same type as those described above for the FLP implementation.

The Tx 126 and Rx 124 optical switches permit the node 24 to effect normal routing when both switches 124, 126 are in the positions illustrated in FIG. 9. Under normal conditions (no fault 120) and in all nodes 24 that are not adjacent to a fault 120 if one exists, the λP wavelength dropped by the OADM 66-1 on the primary fiber 22-1 is routed by the Rx optical switch 124 to the Rx function 60 within the transceiver 34. The λP optical signal generated by the Tx function 70 is routed by the Tx optical switch 126 to the Add function 74-1 within the OADM on the primary fiber 22-1, and is combined by the OADM 66-1, 74-1 into the eastbound-outgoing signal λ1, λ2, . . . λN. If λP is present on the protection fiber 22-2, λP is routed 66-2, 124, 126, 74-2 from Westbound ingress to Westbound egress unaffected.

To overcome, for example, a fiber cut or failed node directly to the East of the node 24 illustrated in FIG. 14, the Rx switch 124 is placed in the normal mode illustrated in FIG. 9, and the Tx switch 126 is placed in the crossed mode illustrated in FIG. 10. In this West loopback mode 150, the λP signal dropped by the OADM 66-1 from the primary fiber 22-1 (i.e. from the West) is routed by the Rx switch 124 to the Rx function 60 of the transceiver 34. The signal generated by the Tx function 70 of the transceiver 34 is routed by the Tx switch 126 to the Add function 74-2 of the OADM 66-2, 74-2 on the protection fiber 22-2, and thus exits Westbound from the illustrated node 24. The Eastbound interface of the node is practically disabled.

To overcome, for example, a fiber cut or failed node directly to the West of the node 24 illustrated in FIG. 14, the Tx switch 126 is placed in the normal mode illustrated in FIG. 9, and the Rx switch 124 is placed in the crossed mode illustrated in FIG. 10. In this East loopback mode 152, the λP signal dropped by the Drop function 66-2 of the OADM 26-2 from the protection fiber 22-2 (i.e., from the East) is routed by the Rx switch 124 to the Rx function 60 of the transceiver 34. The signal generated by the Tx function 70 of the transceiver 34 is routed by the Tx switch 126 to the Add function 74-1 of the OADM 26-1 on the primary fiber 22-1, and thus exits Eastbound from the illustrated node 24. The Westbound interface of the node 24 is practically disabled.

All wavelengths λ1, λ2, . . . λN other than λP pass through the node 24 unaffected in both directions. Under normal conditions all wavelengths λ1, λ2, . . . λN are dropped 66-1 and transmitted 74-1 on the primary fiber 22-1. In the presence of a fault 120 affecting one or more wavelengths λP, the two nodes 20 adjacent the fault 120 for each such wavelength λP can loop 150, 152 that wavelength λP away from the fault 120. As in the case of FLP, each node 20 transmits each wavelength λ1, λ2, . . . λN in only one direction, and consequently a single transceiver 34 per wavelength λ1, λ2, . . . λN need be provided for each node 20 accessing that particular wavelength λ1, λ2, . . . λN.

Figure 15:
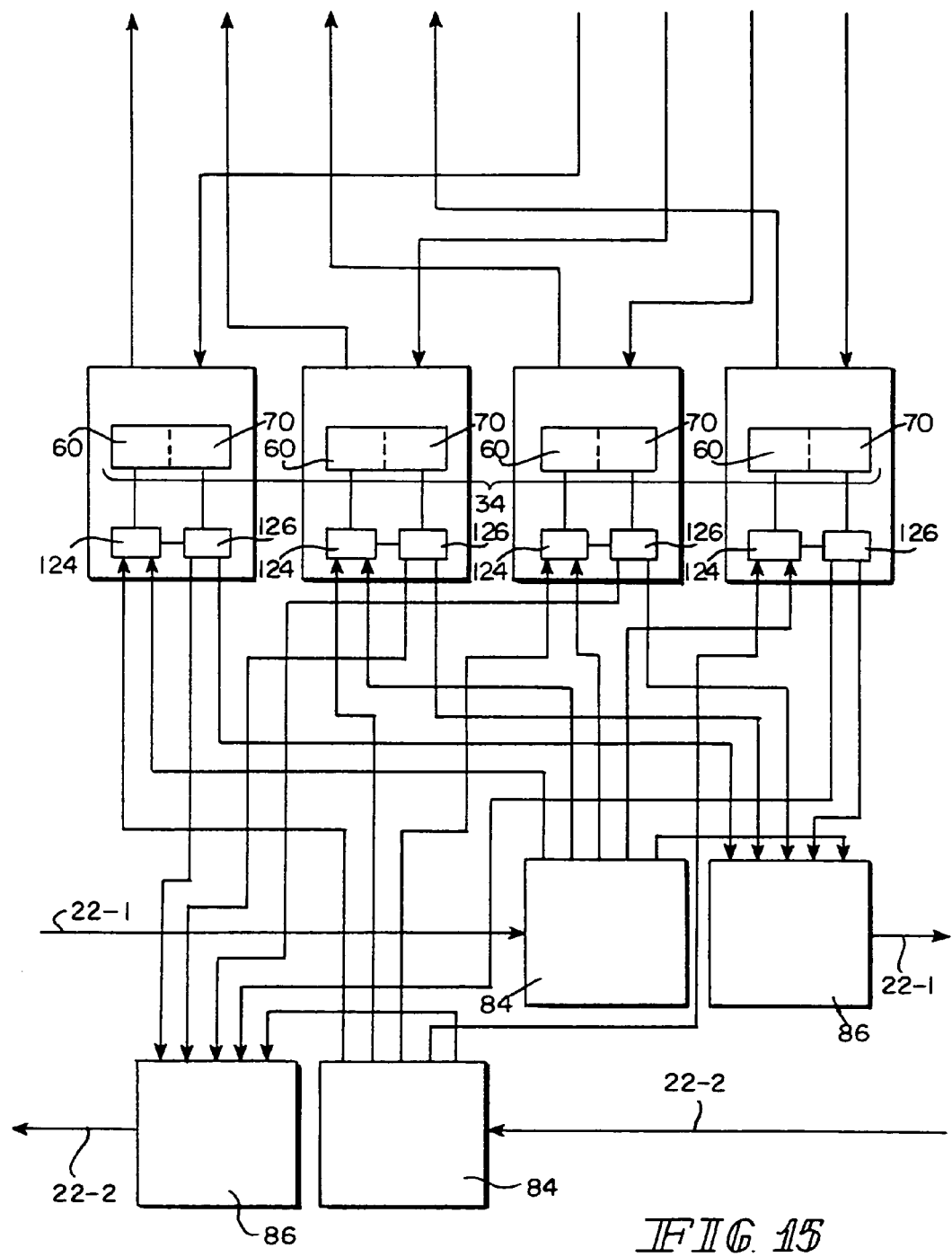
FIG. 15 illustrates a possible architecture of a detail of the system illustrated in FIGS. 12-13.

A possible architecture which supports WLP in type 2 nodes is illustrated in FIG. 15. As illustrated in FIG. 15, the optical signal λ1, λ2, . . . λN entering the DWDM demultiplexer 84-1, 84-2 on each of the fibers 22-1, 22-2 is assumed to be carrying some number of wavelengths, potentially all the wavelengths λ1, λ2, . . . λN active in the network 21'. An optical demultiplexer function 84-1, 84-2 demultiplexes this combined signal into its constituent wavelengths λ1, λ2, . . . λN. As FIG. 15 illustrates, for each wavelength λ1, λ2, . . . λM terminated in this node 28, the version of the wavelength λ1, λ2, . . . λM derived from the demultiplexer 84-1 on the primary fiber 22-1 and the version λ1, λ2, . . . λM derived from the demultiplexer 84-2 on the protection fiber 22-2 are both coupled to an Rx switch 126 for possible application to the Rx/Tx block 60-1, 70-1, 60-2, 70-2, . . . 60-M, 70-M, associated with that wavelength λ 1, λ2, . . . λM. For each wavelength λ1, λ2, . . . λM, the version of λ1, λ2, . . . λM generated by the Rx/Tx block 60-1, 70-1, 60-2, 70-2, . . . 60-M, 70-M, for that wavelength λ1, λ2, . . . λM, and the version of λ1, λ2, . . . λM passed directly from that wavelength's respective Rx switch 124 to that wavelength's respective Tx switch 126 are connected to the two optical multiplexer functions 86-1, 86-2, one on each fiber 22-1, 22-2. Each multiplexer 86-1, 86-2 then combines all the different wavelengths λ1, λ2, . . . λN it receives into a single optical signal λ1, λ2, . . . λN.

Some wavelengths (λ1, λ2, . . . λN)-(λ1, λ2, . . . λM) may not be terminated in the illustrated node 28. These will be optically bridged from the optical demultiplexer 84-1, 84-2 to the optical multiplexer 86-1, 86-2 and will not go through a transceiver 34.

Each of the M Rx/Tx blocks 60-1, 70-1, 60-2, 70-2, . . . 60-M, 70-M and switches 124, 126 illustrated in FIG. 15 is identical to the respective component illustrated in FIG. 14 for the type 1 node 24. That is, each such transceiver block includes a transceiver 60-1, 70-1, 60-2, 70-2, . . . 60-M, 70-M, and two optical switches 124, 126. The receiver 60-1, 60-2, . . . 60-M and transmitter 70-1, 70-2, . . . 70-M are specific to the wavelength λ1, λ, . . . λM assigned to that receiver 60-1, 60-2, . . . 60-M and transmitter 70-1, 70-2, . . . 70-M. The functional description of the receiver 60-1, 60-2, . . . 60-M and transmitter 70-1, 70-2, . . . 70-M is also similar. That is, receiver 60-1, 60-2, . . . 60-M and transmitter 70-1, 70-2, . . . 70-M and their respective switches 124, 126 permit each wavelength λ1, λ2 . . . λM either to run on the primary fiber 22-1 or to be looped back to the East or to the West. The implementation illustrated in FIG. 15 thus permits the type 2 node 28 to route each of the wavelengths λ1, λ2, . . . λM independently of other wavelengths λ1, λ2, . . . λM as required.

WLP can also be augmented with CCBC. A network 21' which embodies WLP as described above can withstand faults 120 such as fiber cuts or other types of faults that render a segment of the fiber 22-1, 22-2 unusable for one or more wavelengths λ1, λ2, . . . λN. Augmenting WLP with CCBC can enhance the resilience of the network 21' by enabling it to withstand the failure of different optical modules such as transceivers 34 or OADM components 66, 74, 84, 86. This enhanced resilience is achieved by having the CCBC 36 replace any of the DWDM channels λ1, λ2, . . . λN in use should any of the DWDM channels λ1, λ2, . . . λN fail.

Figure 16:
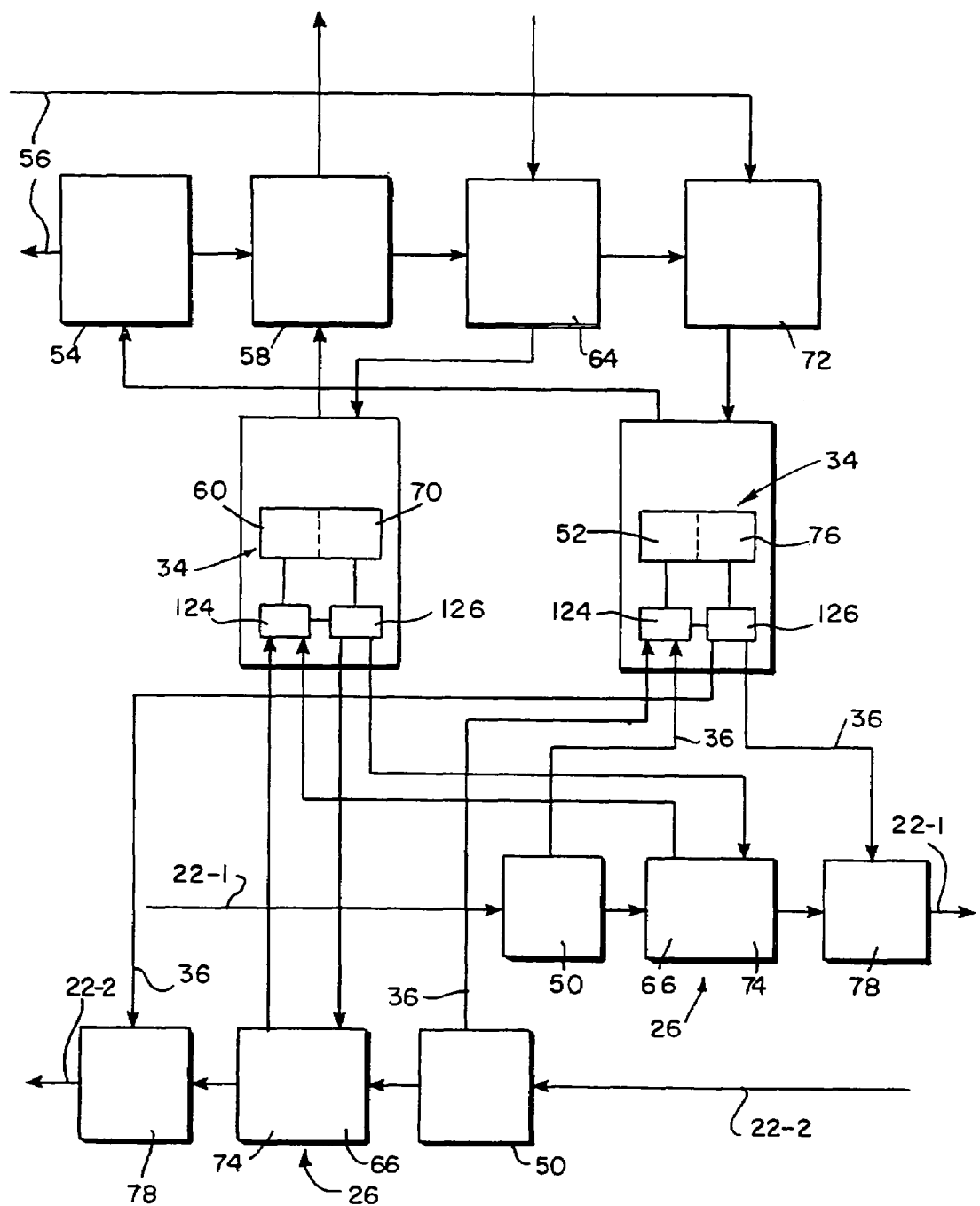
FIG. 16 illustrates a possible architecture of a detail of the system illustrated in FIGS. 12-13; and, FIG. 17 illustrates a possible architecture of a detail of the system illustrated in FIGS. 12-13

Incorporating CCBC into a type 1 node 24 entails changing the implementation of the node 24's optical subsystem 42, for example, as described in connection with FIG. 16. The Rx/Tx block 60, 70, 124, 126 for the DWDM channel λP illustratively is the same as those discussed above. The CCBC 36 is treated in the same way as other channels (λ1, λ2, ... λN)-AC. The CCBC 36 is also protected by the WLP mechanism and can be looped back at any node 24, 28 if necessary, independently of other wavelengths (λ1, λ2, ... λN)-λC. It is thus handled by a Rx/Tx block 52, 76, 124, 126 similar to that used by the DWDM channel λP, with the Rx/Tx block 52, 76, 124, 126 suited to the wavelength λC being used by the CCBC 36. The roles of the control subchannel multiplexer 72 and demultiplexer 54, as well as those of the Rx 58 and Tx 64 selectors, are as discussed above. They permit the CCBC 36 wavelength λC to replace the corresponding DWDM channel wavelength λP in the event of a fault 120 such as, for example, the malfunctioning of the transmitter 70 in the Rx/Tx block 60, 70, 124, 126 for the DWDM channel λP. The CCBC 36 will replace this λP in all nodes that access λP.

Figure 17:
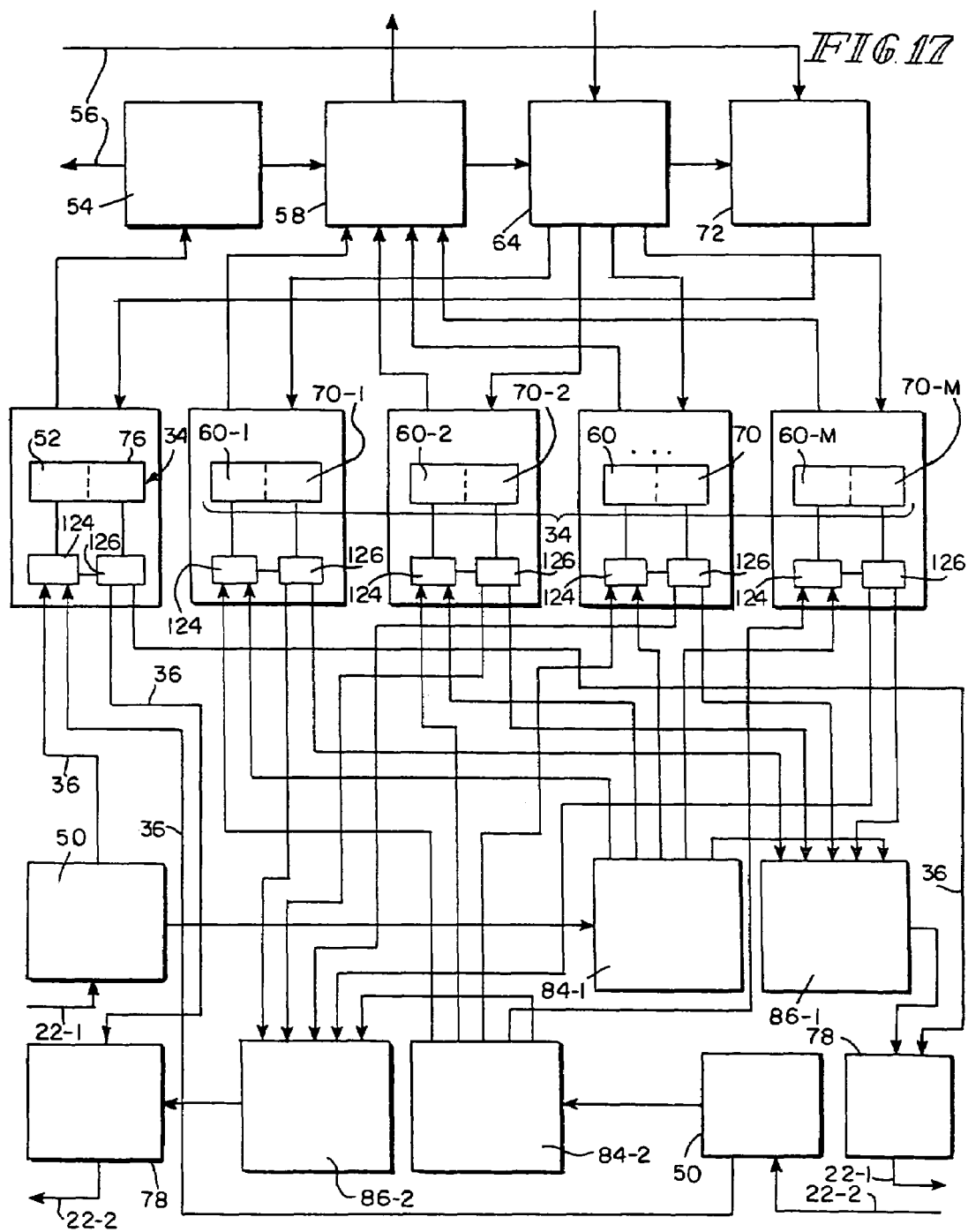

Incorporating CCBC into a type 2 node 28 entails modifying that node 28's optical subsystem 48 as illustrated in FIG. 17. The Rx/Tx blocks 60-1, 70-1, 124, 126, 60-2, 70-2, 124, 126, ... 60-M, 70-M, 124, 126 are as described in connection with the descriptions of earlier embodiments. The CCBC 36 is treated in the same way as other channels λ1, λ2, ... λN. That is, the CCBC 36 is protected by the FLP mechanism and can be looped back at any node 24, 28 if necessary, independently of other wavelengths λ1, λ2, ... λN. It is thus handled by an Rx/Tx block 52, 76, 124, 126 similar to those used by the DWDM channels λ1, λ2, ... λN, with the receiver 52 and transmitter 76 suited to the wavelength λC being used by the CCBC 36.

The roles of the control subchannel multiplexer 72 and demultiplexer 54, and those of the Rx 58 and Tx 64 selectors, are as discussed above. The control sub-channel multiplexer 72 and demultiplexer 54 permit the CCBC 36 to replace any of the DWDM channels λ1, λ2, ... λN terminated at this node 28 in case of failure such as, for example, the malfunctioning of the transmitter 70-P in the Rx/Tx block 60-P, 70-P, 124, 126 for that DWDM channel λP. Again, it should be noted that the CCBC 36 will replace this wavelength λP in all nodes 20 which access it.

To summarize the functional behavior of the optical subsystem 48 for the type 2 node 28, the CCBC 36 is dropped 50. The control subchannel 56 is isolated 54 and passed to the control subsystem 106. The incoming DWDM channels λ1, λ2, ... λM terminated at this node 28 are dropped 84-1, 84-2 and passed 124, 60-1, 124, 60-2, ... 124, 60-M, 58 to the processing subsystem 46. If the CCBC 36 has been activated to replace one of the DWDM channels λ1, λ2, ... λM associated with the type 2 node under consideration, the data component of the CCBC 36 is passed 124, 52, 54, 58 to the processing subsystem 46 instead of one of the DWDM channels λ1, λ2, ... λM.

When the optical subsystem 48 is in the normal state, the data signals provided by the processing subsystem 46 are transmitted on the DWDM channels λ1, λ2, ... λM, which are multiplexed into a combined DWDM signal λ1, λ2, ... λN. The data component of the CCBC 36 is passed 54, 58, 64 through the system transparently and is multiplexed 72 with the control signal 56 generated by the control subsystem 106. The combined signal is transmitted on the CCBC 36. This permits the CCBC 36 to replace wavelengths (λ1, λ2, ... λN)-(λ1, λ2, ... λM) other than the ones λ1, λ2, ... λM associated with the type 2 node 28 under consideration.

When the type 2 node 28 under consideration is in the backup state, one of the data signals provided by the processing subsystem 46 is multiplexed 64, 72 with the control signal 56 generated by the control subsystem 106, and the combined 72 signal is transmitted 76, 126, 78 on the CCBC 36. Other data signals follow their normal paths. It is assumed that all nodes 20 which would otherwise receive the failed wavelength will be in their backup states with respect to the failed wavelength. Once a node 20 is notified through the CCBC 36 that one of the DWDM channels λ1, λ2, ... λN it terminates should be transitioned to the CCBC 36, it puts both its Rx selector 58 and its Tx selector 64 in the backup state.

OADMs 26 can be implemented using, for example, E-TEK model ADOM200031310 OADMs. Transceivers 34 can be implemented using, for example, Hewlett-Packard model RGR-2622 receivers and model HFCT-10XX transmitters. DWDM demultiplexers 84 and DWDM multiplexers 86 can be implemented using, for example, E-TEK model DWDM2F0822310 demultiplexers and model DWDM2F0821310 multiplexers. Switches 124, 126 can be implemented using, for example, Vitesse model VSC830 2×2 switches. Rx and Tx selectors 58, 64, respectively, can be implemented using, for example, Vitesse model VSC880 n×n switches.

The invention claimed is:

1. A method for carrying information modulated on at least two optical carriers, a first one of the carriers having a first wavelength and a second one of the carriers having a second wavelength, and for recovering and transmitting first information modulated on the first carrier and second information modulated on the second carrier, the method comprising:
   demultiplexing the first carrier from a fiber;
   demultiplexing the second carrier from the fiber;
   multiplexing the first carrier on the fiber;
   multiplexing the second carrier on the fiber; and
   receiving and transmitting first and second information, wherein receiving and transmitting the first and second information comprises:
      demodulating first information and modulating first information on the first carrier before the first carrier is placed on the fiber;
      demodulating second information and modulating second information on the second carrier before the second carrier is placed on the fiber; and
   routing the at least two optical carriers, wherein when the first carrier is not capable of transmitting first information over the fiber, the first information is modulated on the second carrier for transmission over the fiber.

2. An apparatus for carrying information modulated on at least two optical carriers, a first one of the carriers having a first wavelength and a second one of the carriers having a second wavelength, and for recovering and transmitting first information modulated on the first carrier and second information modulated on the second carrier, the apparatus comprising:
   a closed loop optical fiber for propagating the optical carriers; and
   at least two nodes, each comprising:
      a demultiplexer for extracting the first carrier from a fiber;
      a demultiplexer for extracting the second carrier from the fiber;
      a multiplexer for injecting the first carrier on the fiber;
      a multiplexer for injecting the second carrier on the fiber;
      a first and second receiver and transmitter for receiving and transmitting first and second information, each comprising:
         a demodulator for demodulating first information and a modulator for modulating first information on the first carrier before the first carrier is placed on the fiber; and a demodulator for demodulating second information and a modulator for modulating second information on the second carrier before the second carrier is placed on the fiber;

a first and second switch each having two inputs, two outputs, and two operational states, the operational states comprising:

coupling the first input to the first output and the second input to the second output during the first operational state;

coupling the first input to the second output and the second input to the first output during the second operational state; and the two inputs and two outputs configured such that:

the first input of the first switch is coupled to the first transmitter;

the second input of the first switch is coupled to the second receiver;

the second output of the first switch is coupled to the second input of the second switch;

the first output of the first switch is coupled to the first transmitter; and the second output of the second switch is coupled to the second transmitter, wherein when the first carrier is not capable of transmitting first information over the fiber, the first information is modulated on the second carrier for transmission over the fiber.

3. The apparatus of claim 2 further comprising:

a third optical carrier having a third wavelength, wherein the first demultiplexer extracts the third carrier from a fiber, and the first multiplexer injects the third carrier on the fiber; and a third receiver and transmitter for receiving and transmitting the third information, comprising a demodulator for demodulating third information and a modulator for modulating third information on the third carrier before the first carrier is placed on the fiber.

4. The apparatus of claim 3, further comprising the first and second switch each having a third input and output port, and four operational states, the operational states comprising:

coupling the first input to the first output, the second input to the second output, and the third input to the third output during the first operational state;

coupling the first input to the second output, the second input to the first output, and the third input to the third output during the second operational state;

coupling the first input to the second output, the second input to the third output, and the third input to the second output during the third operational state;

coupling the first input to the third output, the second input to the second output, and the third input to the first output during the fourth operational state;

the three inputs and three outputs configured such that:

the first input of the first switch is coupled to the first receiver;

the second input of the first switch is coupled to the second receiver;

the third input of the first switch is coupled to the third receiver; and the third output of the first switch is coupled to the third input of the second switch, wherein when one of the first and third carriers is not capable of transmitting one of the first and third information over the fiber, the one of the first and third information is modulated on the second carrier for transmission over the fiber.

5. The apparatus of claim 4 further comprising a fourth optical carrier having a fourth wavelength, wherein the fourth optical carrier passes through at least one of the two nodes without being extracted from the fiber.

6. The apparatus of claim 5 wherein the fiber propagates the fourth optical carrier through the first and second demultiplexers and through the first and second multiplexers.

* * * * *